United States Patent Office.

AMELIA D. POLSGROVE, OF LEWISTOWN, PENNSYLVANIA.

WOOD-PRESERVING COMPOUND.

SPECIFICATION forming part of Letters Patent No. 529,834, dated November 27, 1894.

Application filed September 4, 1894. Serial No. 522,108. (No specimens.)

*To all whom it may concern:*

Be it known that I, AMELIA D. POLSGROVE, a citizen of the United States, residing at Lewistown, in the county of Mifflin and State of Pennsylvania, have invented certain new and useful Improvements in Antiseptic Compounds for Timber; and I do declare the following to be a full, clear, and exact description of the invention, such as will enable others skilled in the art to which it appertains to make and use the same.

The object of this invention is to provide a cheap antiseptic compound for the preservation of timber against the attacks of insects, and against decomposition or decay. It is especially to be used on posts, telegraph poles, &c., which are implanted in the ground, and may be used on piles to guard the latter against the attacks of the marine creatures which rapidly destroy them if they are not protected. Various solutions or compounds have been heretofore used or proposed, for this purpose, but I have found that they are either too costly or expensive, or else require special machinery for applying them to the timber to be treated; or, they required to be heated at each time they were used, so as to be applied in a heated condition. This has proved to be very inconvenient, for it required more or less expensive apparatus.

I have succeeded in forming an antiseptic compound, the ingredients of which are cheap and easily obtained, and which can be used upon wood of any kind, whether green or dry, and which after once prepared, is always ready for use, and can be readily applied to the timber to be treated, by means of a brush while the compound is in a cold state.

I will now proceed to set forth the ingredients of the compound, and the manner in which they are mixed and prepared for use.

In three quarts of boiled linseed oil I dissolve one pound of naphthaline, the naphthaline readily dissolving in the oil either while cold, or when heated. Then after the naphthaline is dissolved, I add one gallon of crude petroleum, and to the resulting solution I add a sufficient quantity of carbonaceous material to give the compound the consistency of paint. I find that usually four quarts of pulverized charcoal, or finely powdered coal are sufficient for my purpose. It will be understood that I do not limit myself to the exact relative quantities as above set forth, as they may be varied at will to suit the character or kind of timber to which the compound is to be applied.

The compound is, as above set forth, applied while cold, with a brush, two coats being sufficient for all general purposes.

While this compound is more particularly for those parts of the posts which are to be sunk beneath the surface of the ground, yet it can be applied as well to the parts above the surface. When it is to be applied to the upper parts of the timbers, I prefer to add to the compound a sufficient quantity of some coloring matter, as chrome yellow, which will make them pleasing to the eye. When colored in this way, it is adapted for use upon the roofs and other exterior surfaces of dwellings, barns, &c., and may be used upon any wood exposed to the weather.

The compound when applied, I have found, will preserve wood from decay for many years, and will successfully resist the attacks of insects or worms.

What I claim is—

1. The herein described antiseptic compound consisting of the following ingredients, namely crude petroleum, linseed oil, naphthaline and carbonaceous material, substantially as set forth.

2. The herein described antiseptic compound consisting of the following ingredients, namely, crude petroleum, one gallon; boiled linseed oil, three quarts; naphthaline, one pound; pulverized charcoal, four quarts, and a sufficient quantity of chrome yellow, substantially as set forth.

In testimony whereof I affix my signature in presence of two witnesses.

AMELIA D. POLSGROVE.

Witnesses:
   T. E. SCHELL,
   F. C. STEIN.